Oct. 12, 1948.  E. W. SONNER, JR  2,451,363
FISHING ROD HOLDER AND BAIT DIGGING APPARATUS
Filed Aug. 21, 1947
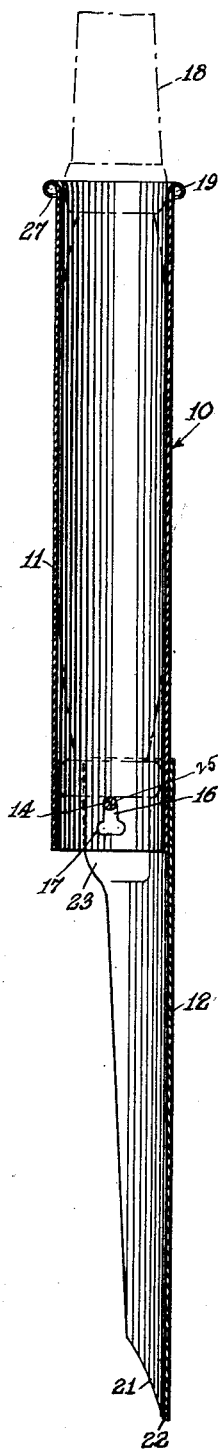
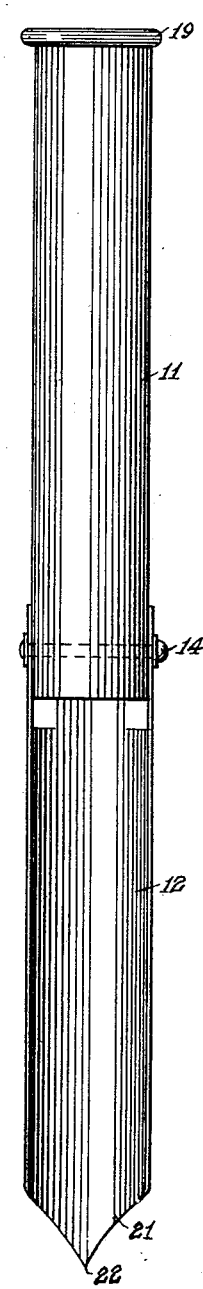
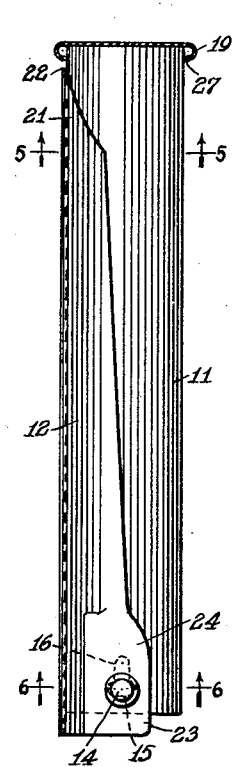
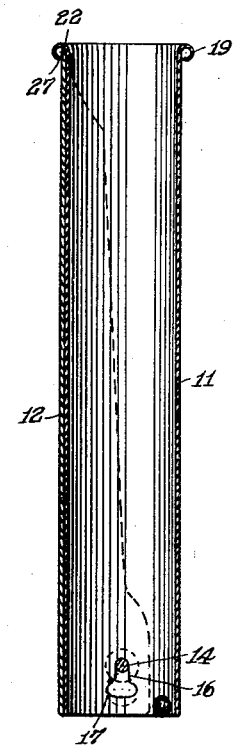
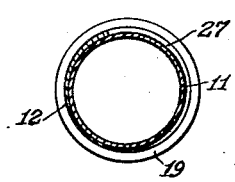
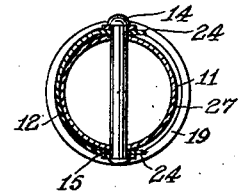
INVENTOR.
EDWIN W. SONNER, JR.
BY
ATTORNEY.

Patented Oct. 12, 1948

2,451,363

UNITED STATES PATENT OFFICE 2,451,363

FISHING ROD HOLDER AND BAIT DIGGING APPARATUS

Edwin W. Sonner, Jr., Queens Village, N. Y.

Application August 21, 1947, Serial No. 769,893

1 Claim. (Cl. 248—38)

This invention relates to new and useful improvements in sand spikes, or rod holders, as used by fishermen, for placing their fishing poles therein, especially during surf-casting; and it has for its object to provide a device that would be easily applicable, sturdy and infallible in use, and which may be folded to be carried as a small unit in one's pocket.

The present invention has further for its purpose to serve as a spike or trowel in digging for bait, and, when it may be desired, digging holes in sand for the momentary burying of the fish caught.

The device, which comprises two major parts, may due to its special construction have these parts arranged in a secure and rigid alignment, whereby said digging may be easily accomplished. In addition one major part of the device has at one end been provided with means in the form of a flange, which serves the purpose of protecting the hands when digging, and at the same time gives further protection against injury to the body of a person, or damage to his clothes from the sharply pointed end of the other major part, as said end is embraced or concealed by said flange, when the device is in collapsed position.

As the device is simple of construction, the cost of manufacturing same is proportionally low.

With the above and other objects in view, this invention consists of the novel features or construction, combination and arrangement of parts, hereinafter fully described, claimed and illustrated in the accompanying drawings forming part of this application, and in which similar characters of reference indicate corresponding parts in all views and in which:

Figure 1 is a vertical, transverse sectional view of my device, showing the latter in extended position.

Figure 2 is a front elevational view of same,

Figure 3 is a side elevational view of my device partly in section, showing my device in the state of being collapsed, or folded; while Figure 4 is a vertical transverse sectional view showing my device in a fully folded position.

Figure 5 is a transverse sectional view taken on the line 5—5 in Figure 3; while Figure 6 is a transverse sectional view taken on the line 6—6 in Figure 3.

Referring more particularly to the drawings, the numeral 10 indicates a fishing pole holder, which may likewise be used for several other purposes, as hereinbefore set forth.

The device comprises a tubular member 11 and a semicylindrical member 12 hingedly connected by a pin 14, which passes through openings 15 in the member 12 and oblong holes 16 in the member 11, said latter holes are at one end enlarged, as shown at 17 in Figure 1, to permit the member 12 to fold upon the member 11.

A fishing pole 18 shown in dotted lines, is inserted in the member 11, which at its upper end is provided with a flange 19 bent upon said member; this flange provides a handy grip upon the device when the latter is used for bait digging, or the like.

The member 12 is provided with a tapered end-portion 21 terminating in a sharp point 22.

The upper end of the member 12 is provided with enlarged side portions 23 which extend beyond a central vertical line in Figure 1; said side portions have their outer extremities formed with susbtantially flat surfaces, as shown at 24, whereby to secure a tight grip upon the member 11 when the two members 11 and 12 are in an extended position, as shown in Figure 1.

To arrange the two members 11 and 12 in an extended position they are pulled towards each other, whereby the pin 14 enters the narrow space 25 of the holes 16.

When it is desired to fold the members 11 and 12 upon each other, said members are pulled apart, whereby the pin 14 enters the enlarged portions 17 of the holes 16, thereby permitting the folding of said members; by subsequently pulling the member 12 downwardly upon the member 11 the point 22 will, when the member 12 is in its lowest downward position, enter the recess 27 in the flange 19, and thus become securely shielded to avoid that any injury or damage is caused by said point, and the device may thus be safely carried in any manner desired.

It is obvious that changes may be made in the form, construction and arrangement of the several parts, as shown, within the scope of the appended claim, without departing from the spirit of the invention, and I do not, therefore, wish to limit myself to the exact construction shown and described herein.

What I claim as new and desire to secure by Letters Patent of the United States is:

A combined fishing pole holder and bait digging device comprising, in combination, a tubular member and a spike, said tubular member being made with a bent-over flange at one end thereof, the circumferential edge of said flange being offset to form a narrow space between said edge and the tubular member, the latter being at the other end formed with oblong holes enlarged at their lower ends, whereby to permit a retraction of and sidewise movement of the spike in folding the latter upon the tubular member, said spike being semi-cylindrical and tapered at one end into a sharp point, the other end of said spike being formed with tubular enlargements upon each side thereof and having holes therein, a pin inserted through said holes and oblong openings whereby to secure the spike and tubular member hingedly together, the tubular enlargements of the spike being formed upon each side with substantially flat surfaces extending beyond a vertical center line of the tubular member, whereby to secure a rigid engagement of the latter to the spike, when in extended position, said tubular member and spike being adapted to move a limited distance up and down relative to each other, when in said extended position, the point of the spike being adapted to be received in the space between the edge of the flange and the tubular member when the spike and said tubular member are folded upon each other.

EDWIN W. SONNER, Jr.

REFERENCES CITED

The following references are of record in the file of this patent:

UNITED STATES PATENTS

| Number | Name | Date |
|---|---|---|
| 729,485 | Briner | May 26, 1903 |
| 1,352,663 | Hafner | Sept. 14, 1920 |

FOREIGN PATENTS

| Number | Country | Date |
|---|---|---|
| 13,052 | Great Britain | 1884 |
| 28,820 | Great Britain | 1906 |